United States Patent
Izumi et al.

(10) Patent No.: US 7,956,560 B2
(45) Date of Patent: Jun. 7, 2011

(54) CONTROL APPARATUS FOR ROTATIONAL ELECTRIC MACHINE AND DRIVING APPARATUS FOR VEHICLE

(75) Inventors: Shiho Izumi, Hitachinaka (JP); Satoru Kaneko, Naka (JP); Hideki Miyazaki, Hitachi (JP); Yutaka Takaku, Mito (JP)

(73) Assignee: Hitachi, Ltd., Tokyo (JP)

( * ) Notice: Subject to any disclaimer, the term of this patent is extended or adjusted under 35 U.S.C. 154(b) by 441 days.

(21) Appl. No.: 12/138,159

(22) Filed: Jun. 12, 2008

(65) Prior Publication Data

US 2008/0309264 A1  Dec. 18, 2008

(30) Foreign Application Priority Data

Jun. 15, 2007 (JP) ................... 2007-159401

(51) Int. Cl.
*H02P 11/06* (2006.01)
(52) U.S. Cl. ..... 318/376; 318/139; 320/124; 180/65.29; 180/65.285
(58) Field of Classification Search .......... 318/139, 318/400.02, 400.07, 376, 362; 320/137, 320/157, 158, 124; 323/276; 180/65.29, 180/65.285
See application file for complete search history.

(56) References Cited

U.S. PATENT DOCUMENTS

| | | | | |
|---|---|---|---|---|
| 4,119,862 A | * | 10/1978 | Gocho | 290/17 |
| 5,550,445 A | * | 8/1996 | Nii | 318/153 |
| 5,909,094 A | * | 6/1999 | Yamada et al. | 318/140 |
| 6,116,368 A | * | 9/2000 | Lyons et al. | 180/165 |
| 6,121,740 A | * | 9/2000 | Gale et al. | 318/376 |
| 6,232,729 B1 | * | 5/2001 | Inoue | 318/139 |
| 6,232,744 B1 | * | 5/2001 | Kawai et al. | 320/132 |
| 6,932,738 B2 | * | 8/2005 | Aoki et al. | 477/5 |
| 6,938,713 B1 | * | 9/2005 | Tahara et al. | 180/65.26 |
| 2002/0024221 A1 | * | 2/2002 | Grewe et al. | 290/40 C |
| 2002/0117913 A1 | | 8/2002 | Raith et al. | |
| 2007/0210769 A1 | * | 9/2007 | Tsutsumi et al. | 323/269 |
| 2007/0267997 A1 | * | 11/2007 | Kanazawa et al. | 320/108 |
| 2009/0159350 A1 | * | 6/2009 | Hanada et al. | 180/65.265 |
| 2009/0243522 A1 | * | 10/2009 | Suhama et al. | 318/376 |

FOREIGN PATENT DOCUMENTS

| | | |
|---|---|---|
| JP | 2000-152409 A | 5/2000 |
| WO | WO 2006/121184 A1 | 11/2006 |
| WO | WO 2007/049810 A1 | 5/2007 |

OTHER PUBLICATIONS

European Search Report dated Feb. 26, 2010 (Five (5) pages).

* cited by examiner

*Primary Examiner* — Rita Leykin
(74) *Attorney, Agent, or Firm* — Crowell & Moring LLP

(57) ABSTRACT

A control apparatus for controlling a rotational electric machine and a driving apparatus for a vehicle that includes an AC motor that rotates wheels and is driven by a power supplied from a battery, an instant variation detecting unit provided in a motor controller that detects a instantaneous variation of a current or voltage of the battery, and a current command operating unit that changes a current command signal for current to be sent to the AC motor, such that an internal loss of the AC motor is increased, by using an internal-loss-increase-use Id·Iq table.

12 Claims, 10 Drawing Sheets

CONTROL APPARATUS FOR ROTATIONAL ELECTRIC MACHINE AND DRIVING APPARATUS FOR VEHICLE

BACKGROUND OF THE INVENTION

The present invention relates to a control apparatus for rotational electric machine and a driving apparatus for vehicle, and particularly to a control apparatus for rotational electric machine and a driving apparatus for vehicle suitable for controlling the rotational electric machine for use in a hybrid vehicle.

In the case of an electric or hybrid vehicle, wheels of which are driven by an electric motor at least, there is a technique that an energy at a time of decelerating control is effectively used, when a vehicle speed is controlled and the vehicle is subject to a braking. That is, a braking force is generated by a regenerative operation of an electric drive motor, and a regenerative energy generated at this time is then accumulated in a battery. However, the battery cannot sometimes accumulate the regenerative power obtained from a driving force of the wheels, when a charge condition of the battery for accumulating the regenerative energy indicates mostly a full charge.

Now, JP-A-2000-152409 has proposed a technique such that a phase of current is changed to lower a generating efficiency for a purpose of lowering an amount of electricity without changing a torque of a generator, when an accumulation of the power is limited to the battery.

SUMMARY OF THE INVENTION

However, JP-A-2000-152409 has simply disclosed a control method of a case where the accumulation is limited to the battery such that the charge condition of battery indicates the full charge.

On the contrary, when an unexpected disturbance occurs in the vehicle such as a slipping of the wheels, an instant regenerative power is generated to occur an instant current or voltage variation at an electric charging side, so that a battery life is made possibly short. Further, when the wheels are returned to a gripping condition from the slipping condition, a discharging power from the battery is varied instantly, so that the battery life is also made possibly short. As described above, there is a problem that the battery life is made possibly short when the charge/discharge power of the battery (charge/discharge current or charge/discharge voltage) is varied instantly by causing the unexpected disturbance occurred in the vehicle. There is also a problem that the battery life is made possibly short by causing the instant variation regardless of a driver's intention.

An object of the invention is to provide a control apparatus for rotational electric machine and a driving apparatus for vehicle capable of reducing an affection for a battery by causing an instant variation of a charge/discharge power relative to the battery.

(1) In order to achieve the object, the invention provides a control apparatus for a rotational electric machine to rotate wheels and to control the rotational electric machine driven by a power supplied from a battery, in which the control apparatus includes an instant variation detecting unit that detects an instant variation of a current or voltage of the battery, and a current command operating unit that changes a current command value to be sent to the rotational electric machine such that the instant variation is detected by the instant variation detecting unit to increase an internal loss of the rotational electric machine.

According to the foregoing constitution, an affection caused by the instant variation on a charge/discharge power for the battery can be reduced.

(2) In the invention (1), preferably, the instant variation detecting unit calculates a battery voltage, after the voltage has risen, by a charge power of the battery after a predetermined time, calculated from a charge power supplied to the presently charged battery and a rotating speed variation of the rotational electric machine to detect the instant variation from the battery voltage after the voltage has risen, when the rotational electric machine operates as a generator.

(3) In the invention (1), preferably, in the case of the control apparatus for the rotational electric machine, the instant variation detecting unit calculates a battery current from a charge power of the battery, after a predetermined time, calculated from a charge power supplied to the presently charged battery and a rotating speed variation of the rotational electric machine to detect the instant variation from the battery current, when the rotational electric machine operates as a generator.

(4) In the invention (1), preferably, the instant variation detecting unit detects the instant variation of the battery current or voltage from a rotating speed variation of the rotational electric machine, when the rotational electric machine operates as a generator.

(5) In the invention (1), preferably, the instant variation detecting unit detects the instant variation of the battery current or voltage from an accumulating capacity of the battery, an open-circuit voltage changing rate of the battery, and a battery temperature, when the rotational electric machine operates as a generator.

(6) In the invention (1), preferably, a generated power from a generator driven by an engine provided independently from the rotational electric machine is charged to the battery. The instant variation detecting unit detects that a gripping is recovered from a slipping of wheels driven by the rotational electric machine, and detects the instant variation of the battery current or voltage, when the rotational electric machine operates as a motor.

(7) In order to further achieve the object, the invention provides a control apparatus for a rotational electric machine to rotate wheels and to control the rotational electric machine driven by a power supplied from a battery, in which the control apparatus includes a slipping detection unit that detects a slipping of the wheels driven by the rotational electric machine, and a current command operating unit that changes a current command value to be sent to the rotational electric machine such that the slipping of driven wheels is detected by the slipping detection unit to increase an internal loss of the rotational electric machine.

According to the foregoing constitution, an affection caused by the instant variation on a charge/discharge power for the battery can be reduced.

(8) In order to further achieve the object, the invention provides a control apparatus for a rotational electric machine to rotate wheels and to control the rotational electric machine driven by a power supplied from a battery, in which the control apparatus includes a slipping/gripping detection unit, provided in the battery independently from the rotational electric machine, that is charged by a generated power from a generator driven by an engine and detects a slipping of wheels driven by the rotational electric machine and a recovery from a gripping of the driven wheels after the slipping, and a current command operating unit that changes a current command value to be sent to the rotational electric machine such that the gripping of the driven wheels is detected to increase an internal loss of the rotational electric machine, after the slipping of the driven wheels is detected by the slipping/gripping detection unit.

According to the foregoing constitution, an affection caused by the instant variation on a charge/discharge power for the battery can be reduced.

(9) Further, in order to further achieve the object, the invention provides a control apparatus for a rotational electric machine to rotate wheels and to control the rotational electric machine driven by a power supplied from a battery, in which the control apparatus includes an instant variation detecting unit that detects an instant variation of a battery current or voltage in accordance with an unexpected disturbance in a vehicle, and a current command operating unit that changes a current command value to be sent to the rotational electric machine such that the instant variation is detected by the instant variation detecting unit to increase an internal loss of the rotational electric machine.

According to the foregoing constitution, an affection caused by the instant variation on a charge/discharge power for the battery can be reduced.

(10) In order to further achieve the object, the invention provides a control apparatus for a rotational electric machine to rotate wheels and to control the rotational electric machine driven by a power supplied from a battery, in which the control apparatus includes an instant variation detecting unit that detects an instant variation of a battery current or voltage regardless of a driver's intention, and a current command operating unit that changes a current command value to be sent to the rotational electric machine such that the instant variation is detected by the instant variation detecting unit to increase an internal loss of the rotational electric machine.

According to the foregoing constitution, an affection caused by the instant variation on a charge/discharge power for the battery can be reduced.

(11) In order to further achieve the object, the invention provides a driving apparatus for a vehicle including a rotational electric machine that rotates wheels by a power supplied from a battery, and a control unit that controls to rotate the rotational electric machine, in which the driving apparatus provides an instant variation detecting unit that detects an instant variation of a battery current or voltage, and a current command operating unit that changes a current command value to be sent to the rotational electric machine such that the instant variation is detected by the instant variation detecting unit to increase an internal loss of the rotational electric machine.

According to the foregoing constitution, an affection caused by the instant variation on a charge/discharge power for the battery can be reduced.

According to the invention, the affection caused by the instant variation on a charge/discharge power for the battery can be reduced.

The other objects, features and advantages of the invention will become apparent from the following description of the embodiments of the invention taken in conjunction with the accompanying drawings.

DESCRIPTION OF THE EMBODIMENTS

Hereinafter, a constitution and operation of a control apparatus for a rotational electric machine in a first embodiment of the invention will be described with reference to FIG. 1 to FIG. 8.

Figure 1:
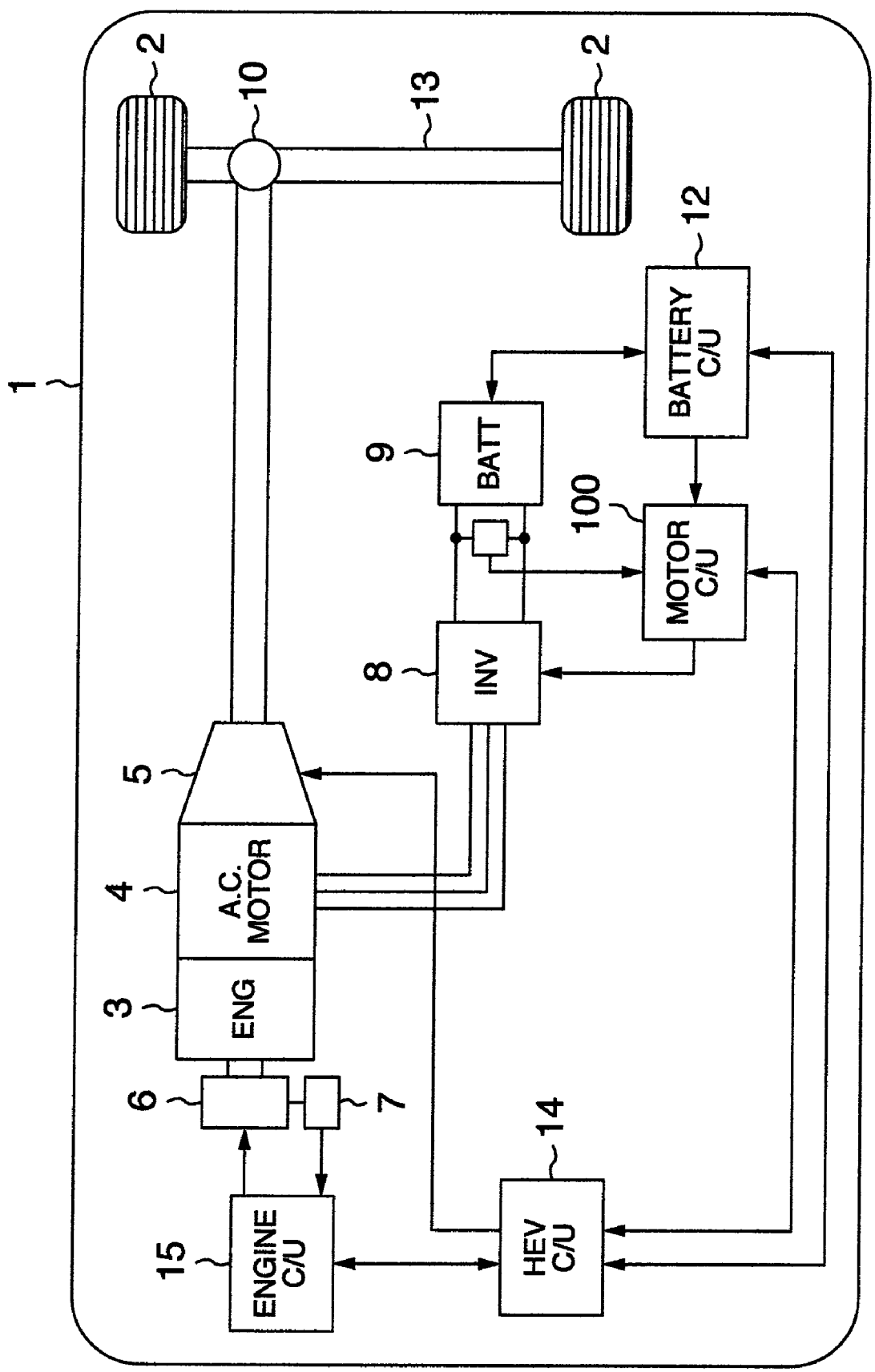
FIG. 1 is a block diagram showing a constitution of a hybrid vehicle using an AC motor with a control apparatus for a rotational electric machine in a first embodiment of the invention.

First, FIG. 1 is a block diagram showing a constitution of a hybrid vehicle using an AC motor with a control apparatus for a rotational electric machine in this embodiment.

A hybrid vehicle 1 provides with an engine 3 and an AC motor 4. A driving force of the engine 3 is transmitted to wheels 2 through a transmission 5, a differential gear 10 and an axle 13. An output from the engine 3 is controlled by an electronic control throttle 6 actuated by a command from an engine control unit (C/U) 15. A throttle opening sensor 7 is provided in the electronic control throttle 6 to detect a throttle opening. A driving force of the AC motor 4 is transmitted to the wheels 2 through the differential gear 10 and axle 13 to rotate the wheels 2.

The AC motor 4 is a motor generator and outputs a driving force when it operates as a motor. Further, the AC motor 4 is driven by the engine 3 and wheels 2 to operate as a generator and to output an AC power.

An inverter 8 is provided to arbitrarily control a necessary motive power for the AC motor 4. The inverter 8 converts a DC power accumulated in a battery 9 to an AC power to be supplied to the AC motor 4. On a regenerative braking and a power generation, the AC power outputted from the AC motor 4 is converted to the DC power by the inverter 8 to be supplied to the battery 9.

The AC motor 4 is driven by using the power accumulated in the battery 9 when the wheels 2 are driven. A regenerative power obtained from the AC motor 4 is supplied to the battery 9 when the regenerative braking is performed by the wheels 2.

An HEV (Hybrid Electric Vehicle) controller 14 is a controller connected with the engine controller 15, a motor controller 100 and a battery controller 12 by communication means such as a CAN (Control Area Network). The HEV controller 14 performs as a HEV system so that a torque command for the AC motor 4 is calculated in accordance with vehicle information and component conditions.

The battery controller 12 calculates parameters such as a charge condition, a current limiting value, a power limiting value, a temperature, and a life, etc. of the battery 9. The motor controller 100 can change a motor control system in response to the condition of battery 9 on the basis of a torque command value obtained from the high-order HEV controller 14, to be supplied to the AC motor 4, when the inverter 8 is actuated. For that purpose, the condition of battery 9 is obtained directly from the battery controller 12 to be able to raise a response speed, without obtaining the condition of battery 9 from the HEV controller 14 through the CAN. Further, it is possible to integrate processes for each of the battery controller 12 and motor controller 100.

The AC motor 4 in this embodiment is used for the motor generator, therefore, it is controlled so that a large amount of currents flown into the battery 9 should be avoided reducing the battery life on a condition where the AC motor 4 operates as a motor generator.

Next, a constitution of the control apparatus for the rotational electric machine will be described with reference to FIG. 2 in a first embodiment of the invention.

Figure 2:
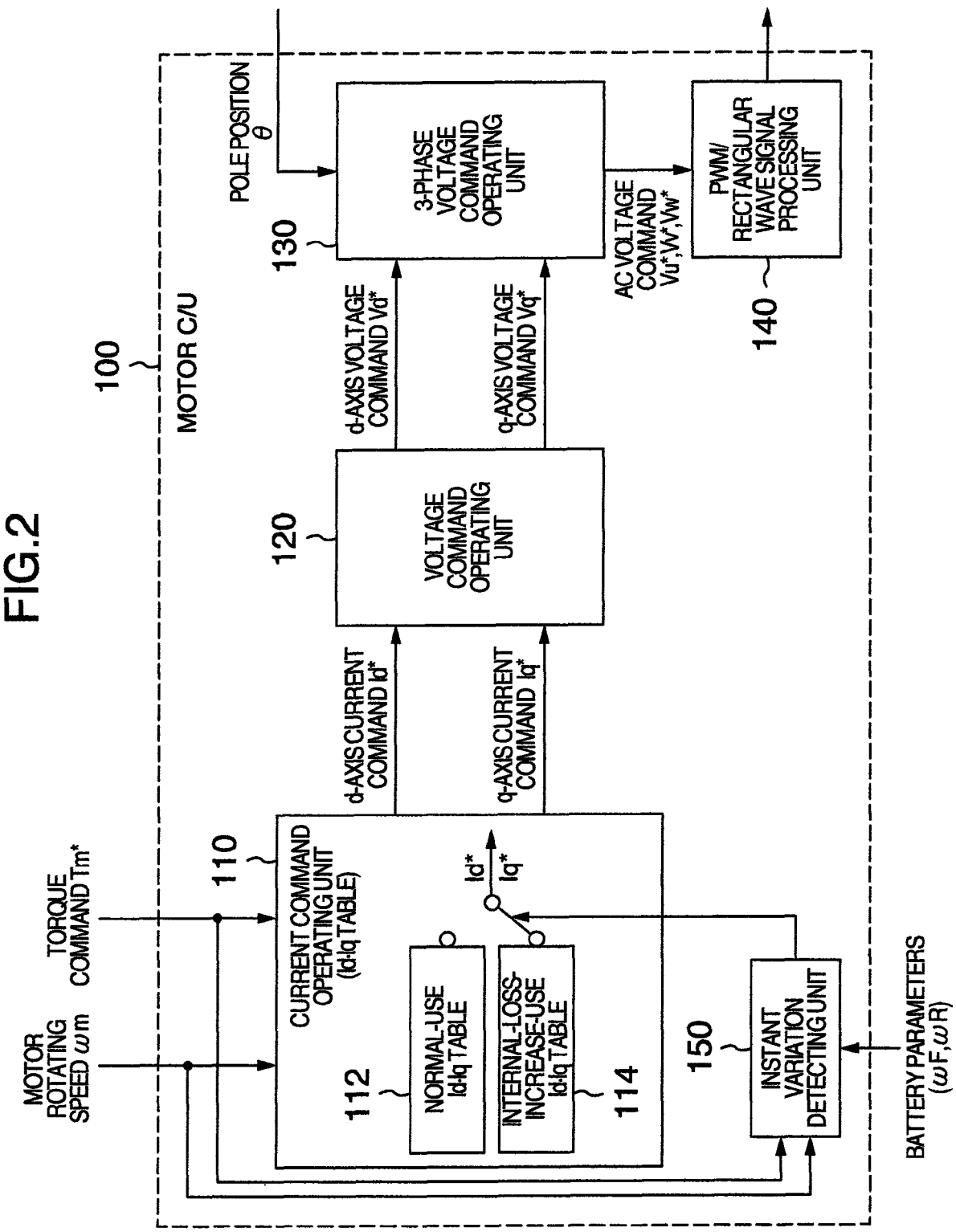
FIG. 2 is a block diagram showing a constitution of the control apparatus for the rotational electric machine in the first embodiment.

FIG. 2 is a block diagram showing the constitution of the control apparatus for the rotational electric machine.

The motor controller 100 provides with a current command operating unit 110, a voltage command operating unit 120, a three-phase voltage command operating unit 130, a PWM/rectangular wave signal processing unit 140, and an instant variation detection unit 150. Further, the current command operating unit 110 provides with a normal-use Id·Iq table 112 and an internal-loss-increase-use Id·Iq table 114. In the foregoing constitution, the internal-loss-increase-use Id·Iq table 114 in the current command operating unit 110 and the instant variation detecting unit 150 has a specific constitution for the invention.

First, a motor control operation will be described with a general constitution, except for the internal-loss-increase-use Id·Iq table 114 and instant variation detecting unit 150.

The current command operating unit 110 provides with the normal-use Id·Iq table 112 in advance. The current command operating unit 110 calculates a d-axis current command value Id* and a q-axis current command value Iq* by using the normal-use Id·Iq table 112, on the basis of a torque command value Tm* and a motor rotating speed ωm supplied from the high-order HEV controller 14. In addition, the motor rotating speed ωm is detected by a pole position sensor or a rotating speed sensor provided in the AC motor 4.

Here, it is assumed that a motor current RMS value is I and a wire wound resistor value is R, the motor current RMS value I is represented by the following expression (1) when using the d-axis current Id and q-axis current Iq.

$$I=(\sqrt{(Id^2+Iq^2)})/\sqrt{3} \quad (1)$$

The voltage command operating unit 120 calculates a d-axis voltage command value Vd* and a q-axis voltage command value Vq* from the d-axis current command value Id* and q-axis current command value Iq* calculated by the current command operating unit 110.

Using a pole position θ detected by the pole position sensor provided in the AC motor 4, the three-phase voltage command operating unit 130 calculates AC voltage command values Vu*, Vv*, Vw* for the AC motor 4 in relation to the d-axis voltage command value Vd* and q-axis voltage command value Vq* obtained from the voltage command operating unit 120.

The PWM/rectangular wave processing unit 140 generates and outputs a drive signal to drive switching devices in the inverter 8 so that it is controlled by the PWM or rectangular wave on the basis of the AC voltage command values Vu*, Vv*, Vw* obtained from the three-phase voltage command operating unit 130.

Next, a description will be concerned with operations of the internal-loss-increase-use Id·Iq table 114 in the current command operating unit 110 and the instant variation detecting unit 150.

The instant variation detecting unit 150 detects that an instant current or voltage variation occurs at a charge side by causing an instant regenerative power, when an unexpected disturbance (an instant variation regardless of a driver's intention) occurs in a vehicle such that the wheels are slipped. A detailed operation of the instant variation detecting unit 150 will be described later with reference to FIG. 3 and FIG. 4.

The instant variation detecting unit 150 detects the instant variation to then output a detecting command signal to the current command operating unit 110. The current command operating unit 110 receives the detecting command signal to switch an Id·Iq table used for a calculation of the d-axis current command value Id* and q-axis current command value Iq* from the normal-use Id·Iq table 112 to the internal-loss-increase-use Id·Iq table 114.

The internal-loss-increase-use Id·Iq table 114 is used for calculating the d-axis current command value Id* and q-axis current command value Iq* so that an excess energy, which is part of the power instant variation, is consumed as a generated heat from the AC motor 4. Specifically, a d-axis current component is increased. The d-axis current is a current to be flown in a magnetic flux direction of the AC motor 4 in which the current becomes an internal loss and becomes a reactive component. In addition, the internal loss of the AC motor 4 may be increased by obtaining the d-axis current command value Id* and q-axis current command value Iq* for a purpose of varying the phase of current frequency of the AC motor 4.

Each of the voltage command operating unit 120, three-phase voltage command operating unit 130 and PWM/rectangular wave signal processing unit 140, operates as described above in response to the d-axis current command value Id* and q-axis current command value Iq* calculated by the current command operating unit 110 using the internal-loss-increase-use Id·Iq table 114. Finally, the PWM/rectangular wave signal processing unit 140 generates and outputs the drive signal for the switching devices in the inverter 8. In this way, the AC motor 4 is driven under a condition where the internal loss is large. Therefore, even though the rotating speed of the AC motor 4 being operated as a motor generator becomes high by a condition where the AC motor 4 is driven under a large internal loss and the wheels are slipped, the regenerative power outputted from the AC motor 4 can be prevented from becoming large, since the instant variation component becomes the internal loss of the AC motor 4. The battery 9 is thus prevented from being applied by a large charge power, so that a deterioration of the battery 9 can be restrained.

Next, a first operation of the instant variation detecting unit 150 in the control apparatus for the rotational electric machine will be described with reference to FIG. 3.

Figure 3:
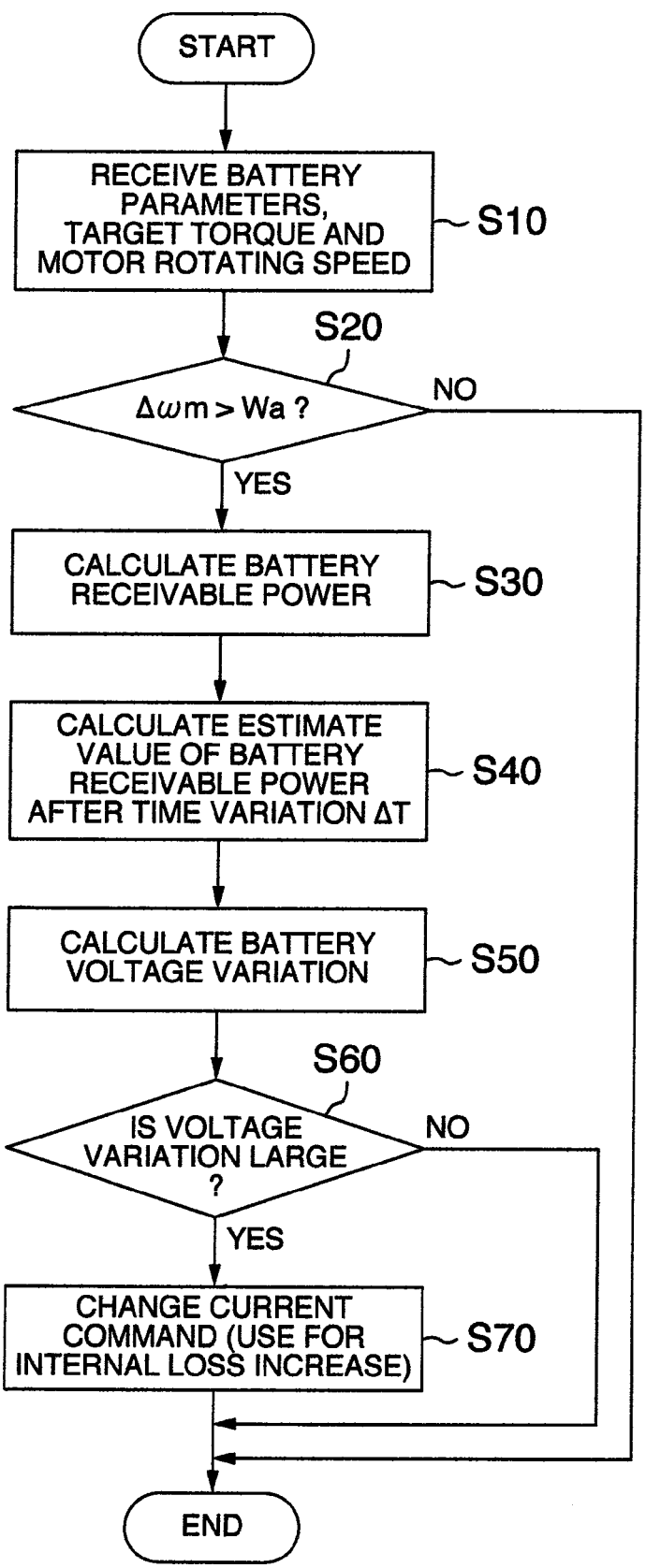
FIG. 3 is a flowchart of a first operation of an instant variation detecting unit in the control apparatus for the rotational electric machine in the first embodiment.

FIG. 3 is a flowchart showing the first operation of the instant variation detecting unit 150 in the first embodiment of the invention.

An example shown in FIG. 3 is that the instant variation detecting unit 150 detects an instant variation by using a voltage variation of the battery 9.

At a step S10, the instant variation detecting unit 150 receives parameters of the battery 9, the motor rotating speed ωm, and the torque command value Tm* to be supplied to the AC motor 4. The parameters of the battery 9 includes an accumulating capacity (SOC (State of Charge)) and its change rate (ΔSOC), a resistance value of the battery 9 and its change rate, a temperature of the battery 9 and its change rate, and an open-circuit voltage (OCV) of the battery 9 and its change rate.

Next, at a step S20, the instant variation detecting unit 150 monitors the motor rotating speed ωm obtained at the step S10 to judge a road surface condition by a time variation Δωm of the motor rotating speed ωm. If a variation of the motor rotating speed ωm at a certain time variation Δt is Δωm to thereby obtain a relation Δωm>Wa (predetermined value), the process moves to a step S30. If it is not, the process is terminated. Therefore, the current command operating unit 110 calculates a normal current command value to perform a normal motor control by using the normal-use Id·Iq table 112.

When the variation of the motor rotating speed is large, at the step S30, the instant variation detecting unit 150 calculates a regenerative power (power) Pm which is generated on outputting a demanded torque in accordance with the following expression (2).

$$Pm = Tm^* \cdot \omega m \quad (2)$$

Next, at a step S40, the instant variation detecting unit 150 calculates a charge power P' to be supplied to the battery 9 after the time variation Δt in accordance with the following expression (3).

$$P' = Pm + Tm^* \cdot \Delta \omega m \quad (3)$$

At a step S50, if the battery 9 receives the calculated charge power P', the instant variation detecting unit 150 estimates a battery voltage Vdc' from a battery voltage Vdc after it has risen, in accordance with the following expression (4). Here, Idc means a battery current.

$$Vdc' = P'/Idc \quad (4)$$

At a step S60, the instant variation detecting unit 150 judges whether the voltage variation of battery 9 is large or small, by the battery voltage Vdc' after the voltage has risen. If the battery voltage is judged that it is risen to an undesirable voltage value after the time variation Δt, the process moves to a step S70. The battery voltage Vdc' after it has risen is a result of considering an amount of raising the voltage caused by the charge power P' in comparison with the presently obtained battery voltage Vdc. The value of battery voltage Vdc' rises rapidly when the regenerative power generates instantly. Therefore, the process moves to the step S70 if the battery voltage Vdc' after it has risen exceeds a certain threshold value Vdca.

In addition, in the judgment at the step S60, the instant variation detecting unit 150 may judge the voltage variation by a change rate or an increase speed of the battery voltage Vdc' other than judge it by the battery voltage Vdc' after the voltage has risen. Further, the instant variation detecting unit 150 may also judge the voltage variation by the accumulating capacity SOC of the battery 9, the change rate ΔSOC of the accumulating capacity of the battery 9, the resistance value of the battery 9, the change rate of the resistance value of the battery 9, the temperature of the battery 9, a temperature change rate of the battery 9, the current limiting value of the battery 9, and the power limiting value of the battery 9. The instant variation detecting unit 150 may also judge it not only by the battery voltage Vdc' after the voltage has risen, but also by the battery voltage (open-circuit voltage of the battery) Vdc.

At the step S70, the instant variation detecting unit 150 changes a current command value to consume an excess power if the variation of battery voltage is large. That is, the instant variation detecting unit 150 notifies to the current command operating unit 110 so that the variation of battery voltage is large. The current command operating unit 110 therefore uses the internal-loss-increase-use Id·Iq table 114 in place of the normal-use Id·Iq table 112 to calculate the d-axis current command value Id* and q-axis current command value Iq*. In this way, an unnecessary energy can be consumed as a generated heat from the AC motor 4 when the battery 9 is subject to an excess load, so that the deterioration of battery 9 can be restrained.

Next, a second operation of the instant variation detecting unit 150 in the control apparatus for the rotational electric machine will be described with reference to FIG. 4.

Figure 4:
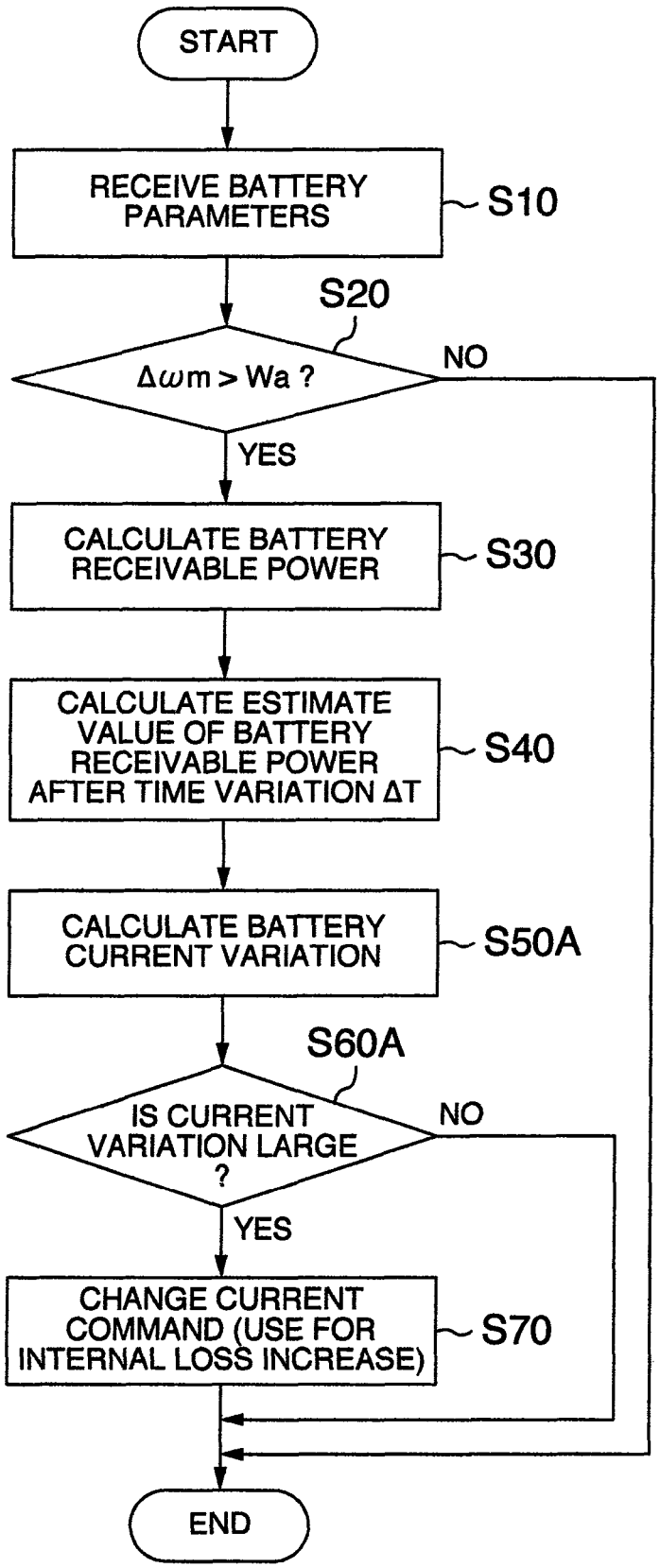
FIG. 4 is a flowchart of a second operation of the instant variation detecting unit in the control apparatus for the rotational electric machine in the first embodiment.

FIG. 4 is a flowchart showing the second operation of the instant variation detecting unit 150 in the first embodiment.

In an example shown in FIG. 4, the instant variation detecting unit 150 detects an instant variation by using the current variation of battery 9. The processes at steps S10 to S40 are the same as those at the steps S10 to S40 shown in FIG. 3.

At a step S10, the instant variation detecting unit 150 receives parameters of the battery 9, a motor rotating speed ωm, and a torque command value Tm* supplied to the AC motor 4. At a step S20, the instant variation detecting unit 150 monitors the motor rotating speed ωm received at the step S10 to judge a road surface condition by a time variation Δωm. If the variation of motor rotating speed is large, the instant variation detecting unit 150 calculates the regenerative power (power) Pm which is generated on outputting a demanded torque in accordance with the expression (2), at a step S30. Next, at the step S40, the instant variation detecting unit 150 calculates the charge power P' to be supplied to the battery 9 after the time variation Δt in accordance with the expression (3).

If the battery 9 receives the calculated charge power P' at a step S50A, the instant variation detecting unit 150 estimates a battery current in accordance with the following expression (5). Here, Vdc is a voltage of the battery 9.

$$Idc' = P'/Vdc \quad (5)$$

If the estimated battery current Idc' is greater or equal to a predetermined value at a step S60A, the process moves to a step S70 since a large amount of current would be flown into the battery 9. The instant variation detecting unit 150 then changes to a current command value to consume the excess power.

If the battery current is large, the instant variation detecting unit 150 changes a current command value to consume the excess power, at the step S70. That is, the instant variation detecting unit 150 notifies to the current command operating unit 110 so that the battery current is large. The current command operating unit 110 therefore uses the internal-loss-increase-use Id·Iq table 114 in place of the normal-use Id·Iq table 112 to calculate the d-axis current command value Id* and q-axis current command value Iq*.

Since a large amount of currents is instantly flown into the battery 9 to make possibly the battery life, a condition of flowing the large amount of currents is detected as early as possible to avoid charging excessively the current to the battery 9. Particularly, it is presumable that the condition could be occurred frequently when the charge condition or SOC of the battery 9 is high. Therefore, the foregoing condition is judged and processed instantly, so that the battery 9 can be prevented from being flown the large amount of currents thereto. In this way, an unnecessary energy can be consumed as a generated heat from the AC motor 4 when the battery 9 is subject to an excess load, so that the deterioration of battery 9 can be restrained.

Next, a third operation of the instant variation detecting unit 150 in the control apparatus for the rotational electric machine will be described with reference to FIG. 5.

Figure 5:
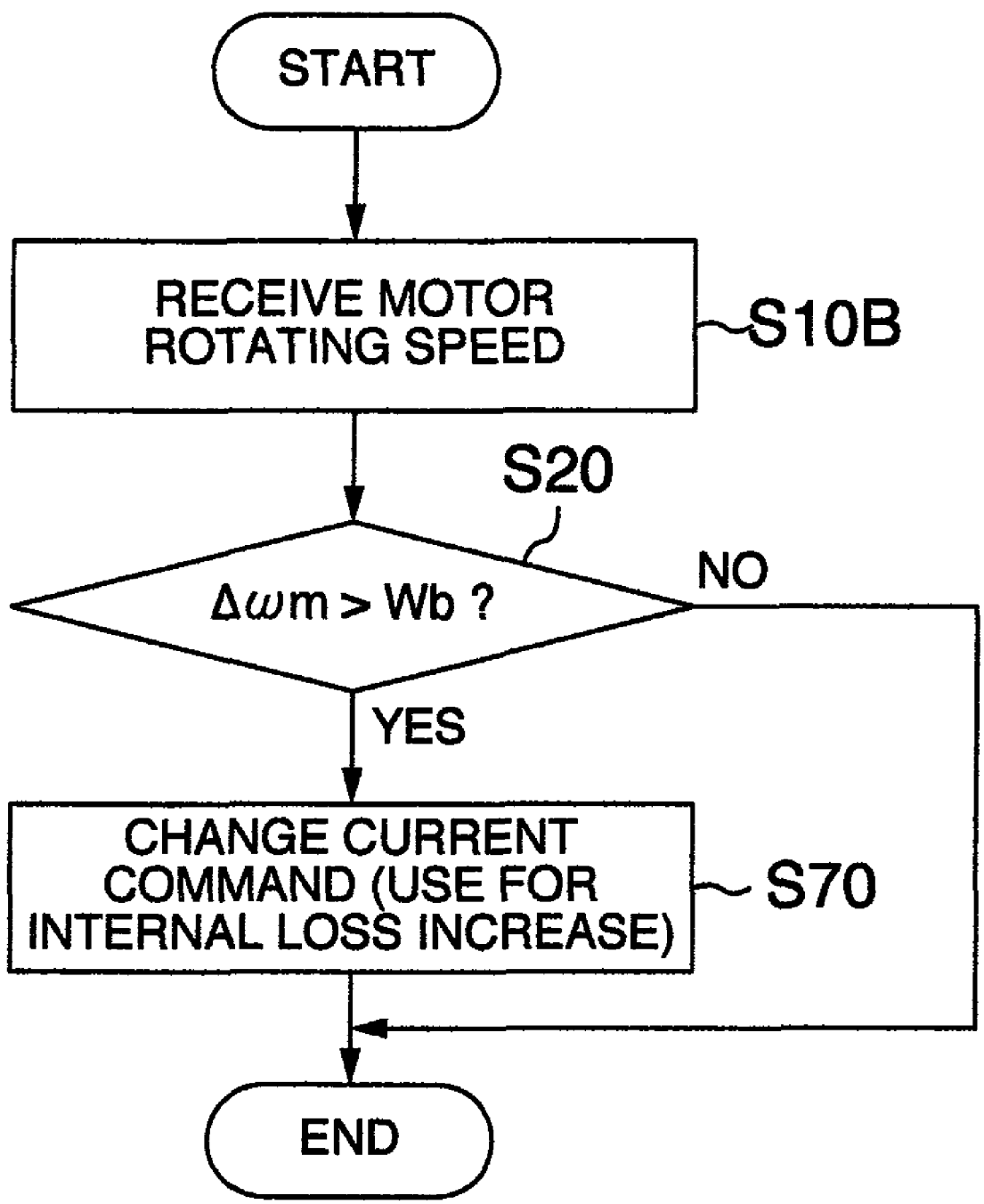
FIG. 5 is a flowchart of a third operation of the instant variation detecting unit in the control apparatus for the rotational electric machine in the first embodiment.

FIG. 5 is a flowchart showing the third operation of the instant variation detecting unit 150 in the first embodiment.

In an example shown in FIG. 5, the instant variation detecting unit 150 judges an occurrence of slipping the wheels to detect an instant variation. The instant variation detecting unit 150 provides with a function of a slipping detection.

At a step S10B, the instant variation detecting unit 150 receives the motor rotating speed ωm.

At a step S20, the instant variation detecting unit 150 monitors the motor rotating speed ωm received at the step S10B to judge a presence or absence of a slipping by using the time variation Δωm. If a variation of the motor rotating speed ωm at a certain time variation Δt is Δωm to thereby obtain a relation Δωm>Wb (predetermined value), the process moves to a step S70 since the process at the step S20 judges that the slipping is being occurred. If it is not, the process is terminated. Therefore, the current command operating unit 110 calculates a normal current command value to perform a normal motor control by using the normal-use Id·Iq table 112.

If the variation of the motor rotating speed is large, the instant variation detecting unit 150 changes a current command value to consume the excess power, at the step S70. That is, the instant variation detecting unit 150 notifies to the current command operating unit 110 so that the variation of battery voltage is large. The current command operating unit 110 then uses the internal-loss-increase-use Id·Iq table 114 in place of the normal-use Id·Iq table 112 to calculate the d-axis current command Id* and q-axis current command value Iq*. In this way, an unnecessary energy can be consumed as a generated heat from the AC motor 4 when the battery 9 is subject to an excess load, so that the deterioration of battery 9 can be restrained.

In addition, in the foregoing example, the slipping is judged by using the motor rotating speed ωm, but it may be judged by using other methods. In the case of a recent vehicle, a wheel rotating speed sensor is provided for each of the four wheels to detect the motor rotating speed. Assuming that a left-front wheel rotating speed is ωFL to be detected by a left-front wheel rotating speed sensor, a right-front wheel rotating speed is ωFR to be detected by a right-front wheel rotating speed sensor, a left-rear wheel rotating speed is ωRL to be detected by a left-rear wheel rotating speed sensor, and a right-rear wheel rotating speed is ωRR to be detected by a right-rear wheel rotating speed sensor, a front-wheel rotating speed ωf is obtained from an average of the left-front wheel rotating speed ωFL and right-front wheel rotating speed ωFR. Further, a rear-wheel rotating speed ωR is obtained from a average of the left-rear wheel rotating speed ωRL and right-rear wheel rotating speed ωRR. It is then judged that the slipping is being occurred if a difference between the front-wheel rotating speed ωf and rear-wheel rotating speed ωR is equal to or greater than a predetermined value. The instant variation detecting unit 150 therefore detects and judges the occurrence of slipping from the front-wheel rotating speed ωf and rear-wheel rotating speed ωR. At the step S70, the instant variation detecting unit 150 changes a current command value to consume the excess power.

Next, a fourth operation of the instant variation detecting unit 150 in the control apparatus for the rotational electric machine will be described with reference to FIG. 6 to FIG. 8.

Figure 6:
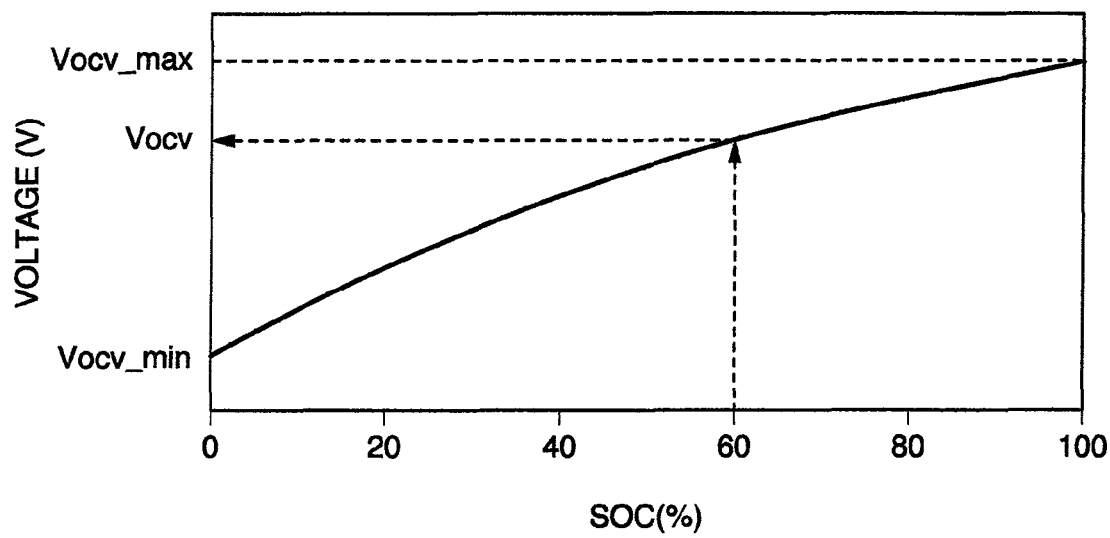
FIG. 6 is an explanatory diagram showing a fourth operation principle of the instant variation detecting unit in the control apparatus for the rotational electric machine in the first embodiment.
Figure 7:
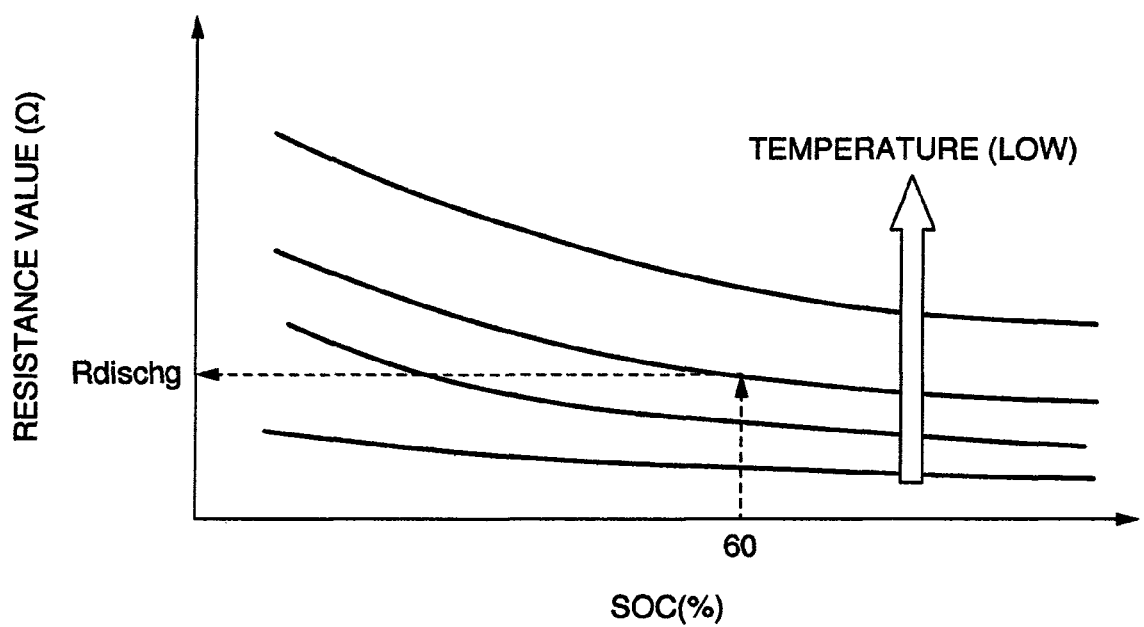
FIG. 7 is an explanatory diagram showing the fourth operation principle of the instant variation detecting unit in the control apparatus for the rotational electric machine in the first embodiment.
Figure 8:
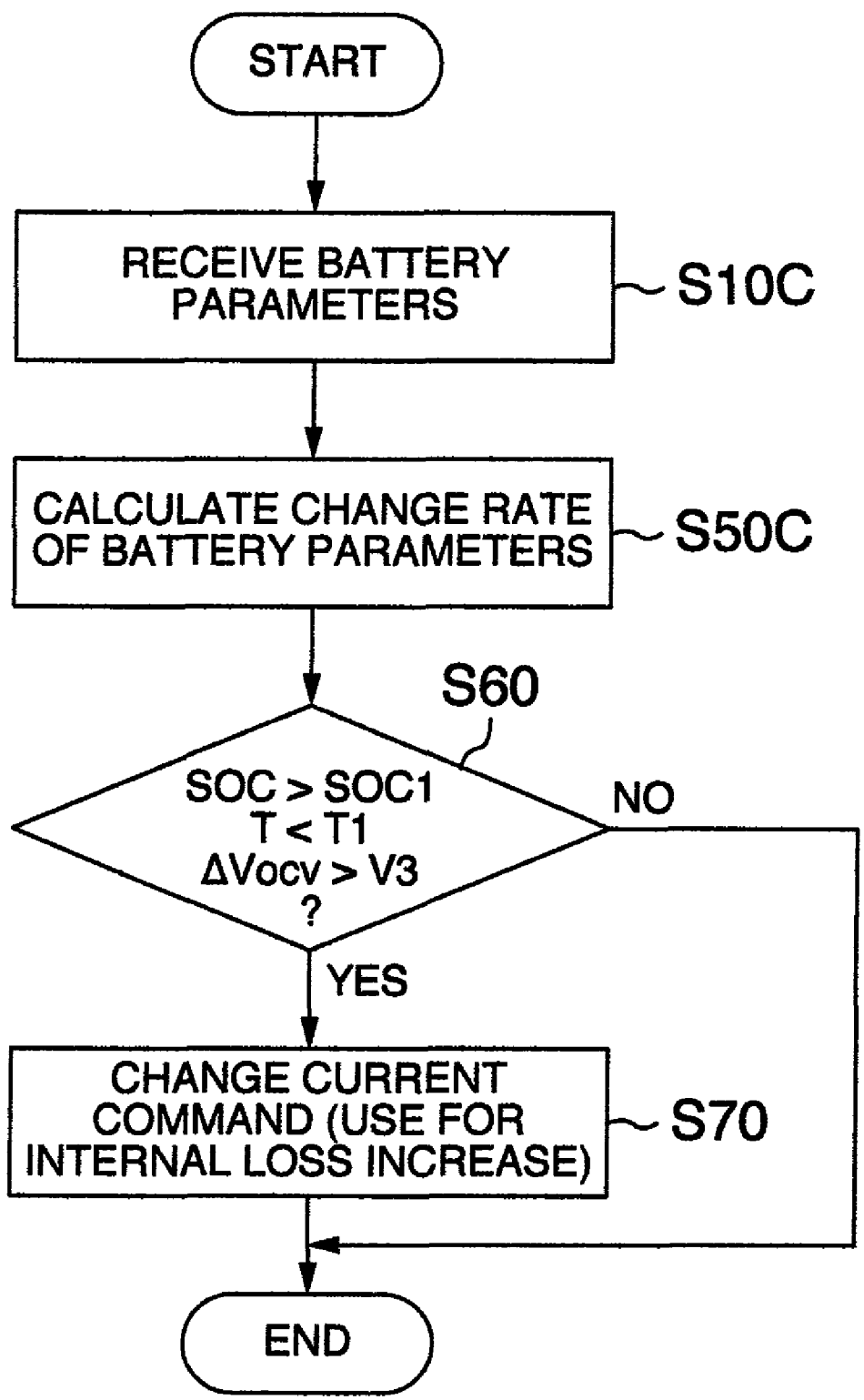
FIG. 8 is a flowchart of the fourth operation the instant variation detecting unit in the control apparatus for the rotational electric machine in the first embodiment.

FIG. 6 and FIG. 7 are explanatory diagrams of the fourth operational principle of the instant variation detecting unit 150 in the first embodiment. FIG. 8 is a flowchart showing the fourth operation of the instant variation detecting unit 150.

The instant variation detecting unit 150 in this example judges a slipping occurrence of wheels to detect an instant variation, and it also provides a function of detecting the slipping.

FIG. 6 indicates a relation between an accumulating capacity SOC of the battery 9 and a voltage V thereof. Both the accumulating capacity SOC and the voltage V are linearly proportional.

FIG. 7 indicates a relation between the accumulating capacity SOC of the battery 9 and a resistance value thereof. The larger the accumulating capacity SOC of the battery is, the smaller the resistance value thereof becomes. Further, the lower the temperature in response to the temperature of battery 9, the larger the resistance value thereof becomes.

There would be occurrences such as an instantly occurred large power or large currents that cannot be predicted by a driver, because of an unexpected disturbance to the vehicle. Such occurrence adversely affects not only traveling performance of the vehicle, but also the battery life. Particularly, as indicated on FIG. 6 and FIG. 7, the occurrence of large current (charge side) makes the battery 9 to deteriorate quickly since the resistance value becomes large when the charging condition (SOC) of battery 9 is high and the temperature is low.

Next, a detecting method of detecting the instantly occurred large current will be described by internal information of the battery 9 with reference to FIG. 8.

At a step S10C, the instant variation detecting unit 150 receives parameters of the battery 9, specifically, receives an accumulating capacity (SOC) of battery 9, a temperature (T), and an open-circuit voltage (Vocv).

At a step S50C, the instant variation detecting unit 150 calculates a change rate of each battery parameter, specifically, a change rate ΔVocv of the open-circuit voltage Vocv on a certain time variation Δt.

At a step S60C, the instant variation detecting unit 150 detects an instantly occurred large current when the change rates ΔVocv of both the accumulating capacity SOC and open-circuit voltage exceed respectively a predetermined threshold value SOC1 or V3, and the temperature (T) is lower than a predetermined value T1. In addition, the foregoing judgment may use parameters such as ΔSOC and ΔT.

The instantly occurred large current is detected at the step S60C so that the instant variation detecting unit 150 changes the current command value to consume the excess power at a step S70. That is, the instant variation detecting unit 150 notifies to the current command operating unit 110 so that the instantly occurred large current is occurred. The current command operating unit 110 then uses the internal-loss-increase-use Id·Iq table 114 in place of the normal-use Id·Iq table 112 to calculate the d-axis current command Id* and q-axis current command value Iq*.

In this way, an unnecessary energy can be consumed as a generated heat from the AC motor 4 when the battery 9 is subject to an excess load, so that the deterioration of battery 9 can be restrained.

In addition, the detection of instant variation in this example may be performed inside the battery controller 12 in place of the motor controller 100.

Next, a constitution and operation of the control apparatus for the rotational electric machine in a second embodiment will be described with reference to FIG. 9 to FIG. 11.

First, a constitution of a hybrid vehicle using an AC motor with the control apparatus for the rotational electric machine will be described below.

Figure 9:
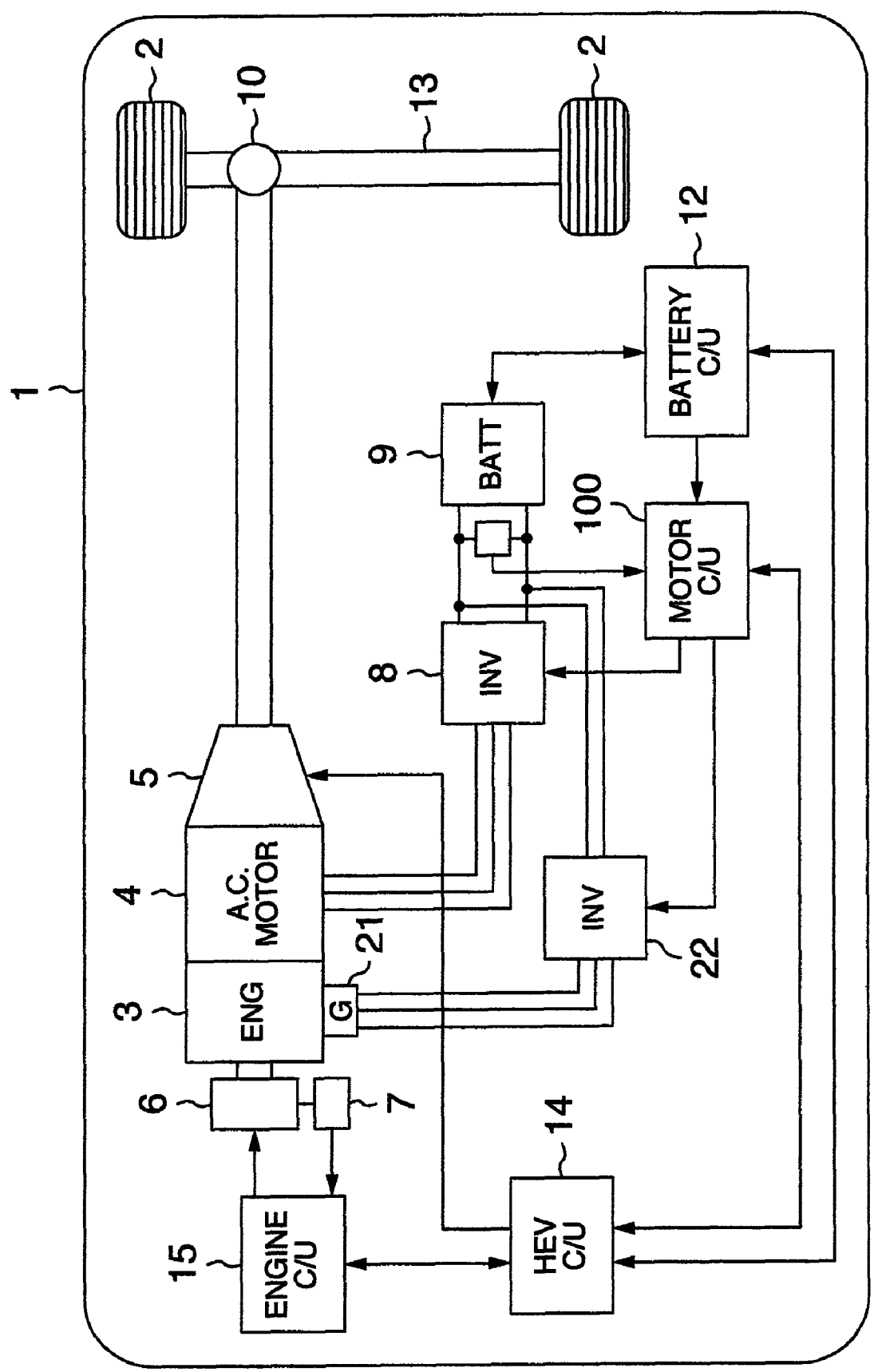
FIG. 9 is a block diagram showing a constitution of a hybrid vehicle using an AC motor with a control apparatus for a rotational electric machine in a second embodiment of the invention.

FIG. 9 is a block diagram showing the constitution of hybrid vehicle in the second embodiment. The same reference numerals shown in FIG. 1 indicate the same constitutional elements in FIG. 9.

In this embodiment, the hybrid vehicle 1 provides an exclusive high-voltage generator 21 driven by the engine 3 in addition to the AC motor 4 as operated a motor generator, and an inverter 22 which converts a three-phase output from the high-voltage generator 21 into a DC power. The output of high-voltage generator 21 is converted to the DC power by the inverter 22 to accumulate in the battery 9.

In the case where the hybrid vehicle 1 as described in this embodiment provides the exclusive high-voltage generator 21 independent from the AC motor 4, a large amount of currents is sometimes supplied to the battery 9 when the hybrid vehicle is driven in a power running by the AC motor 4.

Here, the occurrence of large amount of power will be described with reference to FIG. 10, when the hybrid vehicle with the control apparatus for the rotational electric machine is driven in the power running in the second embodiment.

Figure 10:
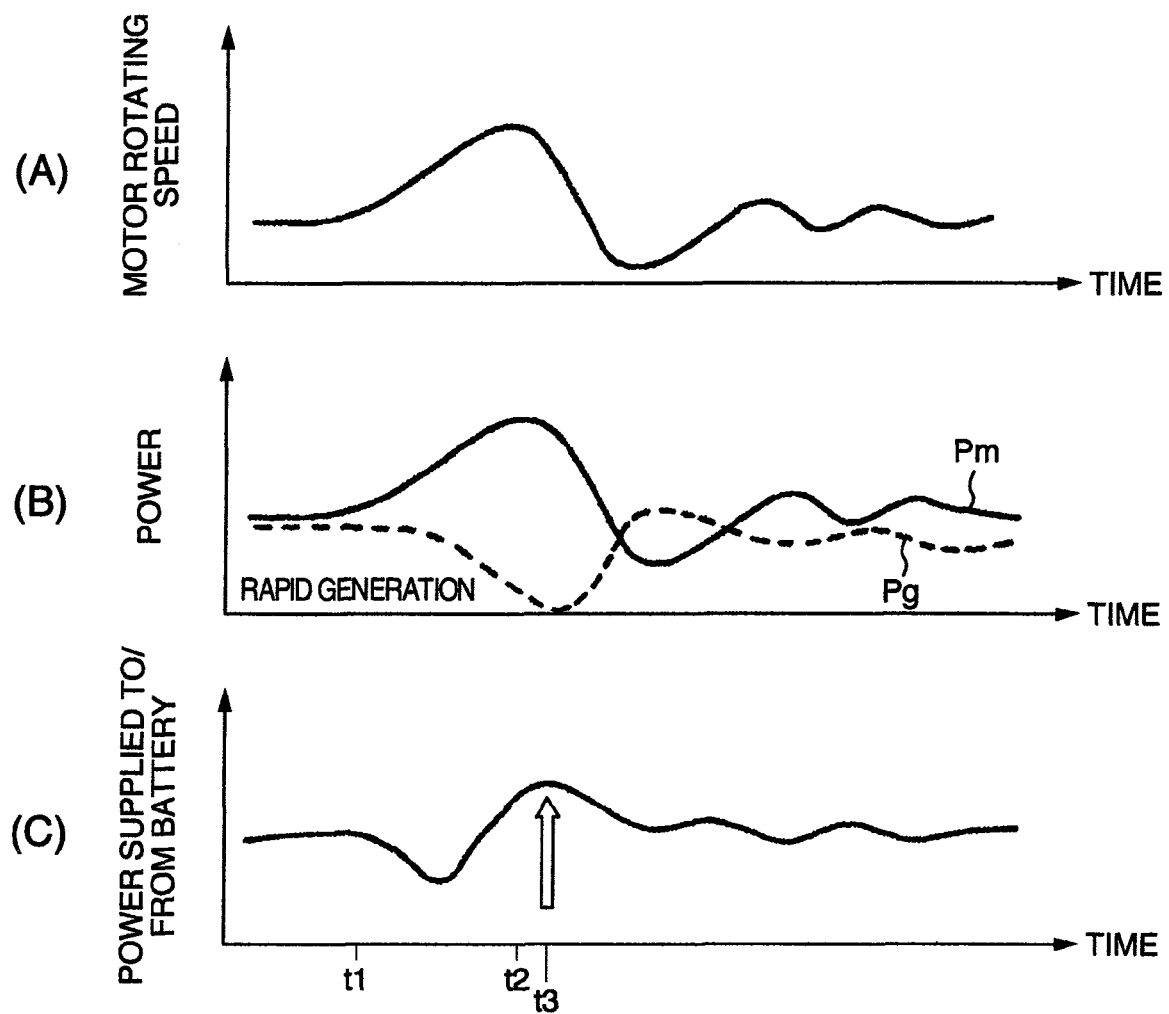
FIG. 10 is an explanatory diagram showing a principle of causing a large amount of electric power on a power running in the hybrid vehicle with the control apparatus for the rotational electric machine in the second embodiment of the invention.

FIG. 10 is an explanatory diagram showing a principle of causing the large amount of power in this embodiment.

Referring to FIG. 10, a lateral axis indicates a time. A vertical axis in (A) of FIG. 10 indicates the motor rotating speed of AC motor 4. A vertical axis in (B) of FIG. 10 indicates a consuming power of the AC motor 4 and a generating power of the high-voltage generator 21. (C) of FIG. 10 indicates an input/output power to be supplied to the battery 9.

The AC motor 4 is driven as a motor in the power running. FIG. 10 indicates that the wheel 2 is slipped at a time t1, the slipping condition is continued by a time t2, and a gripping of the wheel 2 is recovered at a time t2.

The wheel 2 is slipped at the time t1 to rapidly raise the rotating speed of the AC motor 4 as shown in (A) of FIG. 10. Consequently, a power consumption Pm of the AC motor 4 increases as indicated a solid line in (B) of FIG. 10. The power consumption Pm of AC motor 4 rises to make the discharge of battery 9 large, and to be controlled so that a generating capacity of the high-voltage generator 21 becomes large. Therefore, a generating capacity Pg of the high-voltage generator 21 increases rapidly. In addition, the vertical axis relative to the generating capacity Pg indicates that the closer the vertical axis to a zero, the larger the amount of the generation becomes in (B) of FIG. 10.

There is a time delay between the increases of the power consumption Pm of the AC motor 4 and the generating capacity Pg of the high-voltage generator 21. Therefore, for example, the slipping of the wheel 2 is terminated to recover the gripping at the time t2, and the power consumption Pm of AC motor 4 then begins to decrease. However, the generating capacity Pg of the high-voltage generator 21 still remains increased. A large amount of power to be charged in the battery 9 is therefore generated at a time t3, as shown in (C) of FIG. 10. Consequently, the life of battery 9 becomes possibly short by causing the large amount of power.

Next, another operation of the instant variation detecting unit 150 in the control apparatus for the rotational electric machine will be described with reference to FIG. 11.

Figure 11:
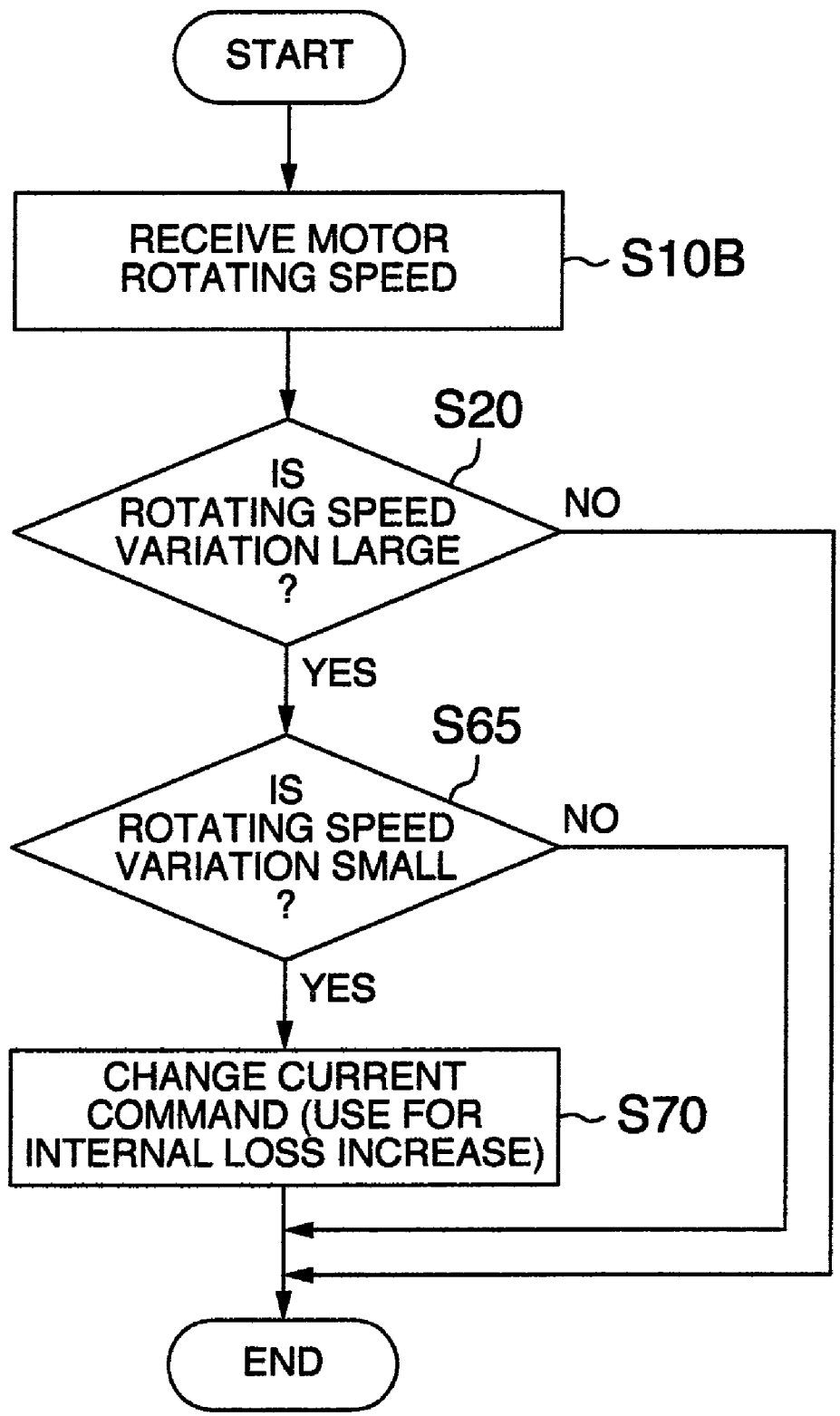
FIG. 11 is a flowchart of an operation of the instant variation detecting unit in the control apparatus for the rotational electric machine in the second embodiment.

FIG. 11 is a flowchart showing the operation of the instant variation detecting unit 150 in the second embodiment.

The instant variation detecting unit 150 in this example judges the slipping and gripping occurrences of the wheels to detect an instant variation. For that purpose, the instant variation detecting unit 150 provides a function of detecting the slipping and gripping.

At a step S10B, the instant variation detecting unit 150 receives the motor rotating speed $\omega m$.

AT a step S20, the instant variation detecting unit 150 monitors the motor rotating speed $\omega m$ received at the step S10B to judge a presence or absence of the slipping by the time variation $\Delta \omega m$. If the variation of the motor rotating speed $\omega m$ at a certain time variation $\Delta t$ is $\Delta \omega m$ to thereby obtain a relation $\Delta \omega m > Wb$ (predetermined value), the process moves to a step S30 since the process at the step S20 judges that the slipping is being occurred. If it is not, the process is terminated. Therefore, the current command operating unit 110 calculates a normal current command value to perform a normal motor control by using the normal-use Id·Iq table 112.

It is judged that the slipping of wheels 2 is being occurred if the variation of the motor rotating speed is large. It is therefore judged whether the variation of the motor rotating speed becomes smaller than a predetermined value at a step S65. As shown in (A) of FIG. 10, the wheels 2 are slipped at the time t1 to raise the motor rotating speed. However, the gripping is recovered at the time t2 to terminate the rising of motor rotating speed, subsequently, the motor rotating speed drops. That is, the gripping recovery after slipping can be judged by whether the variation of the motor rotating speed is smaller than a predetermined value, since the variation of the motor rotating speed becomes zero at the time t2.

The instant variation detecting unit 150 changes the current command value to consume the excess power at a step S70, after recovering the gripping from the slipping. That is, the instant variation detecting unit 150 notifies to the current command operating unit 110 so that the gripping is recovered. The current command operating unit 110 uses the internal-loss-increase-use Id·Iq table 114 in place of the normal-use Id·Iq table 112 to calculate the d-axis current command Id* and q-axis current command value Iq*. In this way, an unnecessary energy can be consumed as a generated heat from the AC motor 4 when a large amount of power is possibly supplied to the battery 9 as indicated a time t3 in (C) of FIG. 10, so that the deterioration of battery 9 can be restrained.

In addition, in the foregoing example, the slipping and gripping are judged by using the motor rotating speed $\omega m$, however, may be judged by using other methods. In the case of a recent vehicle, a wheel rotating speed sensor is provided for each of the four wheels to detect the motor rotating speed. Assuming that a left-front wheel rotating speed is $\omega FL$ to be detected by a left-front wheel rotating speed sensor, a right-front wheel rotating speed is $\omega FR$ to be detected by a right-front wheel rotating speed sensor, a left-rear wheel rotating speed is $\omega RL$ to be detected by a left-rear wheel rotating speed sensor, and a right-rear wheel rotating speed is $\omega RR$ to be detected by a right-rear wheel rotating speed sensor, a front-wheel rotating speed $\omega f$ is obtained from an average of the left-front wheel rotating speed $\omega FL$ and right-front wheel rotating speed $\omega FR$. Further, a rear-wheel rotating speed $\omega R$ is obtained from a average of the left-rear wheel rotating speed $\omega RL$ and right-rear wheel rotating speed $\omega RR$. It is then judged that the slipping is being occurred if a difference between the front-wheel rotating speed $\omega f$ and rear-wheel rotating speed $\omega R$ is equal to or greater than a first predetermined value. It is also judged that the gripping is recovered from the slipping if the difference between the front-wheel rotating speed $\omega f$ and rear-wheel rotating speed $\omega R$ is equal to or less than a second predetermined value. The instant variation detecting unit 150 then detects the slipping and gripping from the front-wheel rotating speed ωf and rear-wheel rotating speed ωR. The instant variation detecting unit 150 judges that the gripping is recovered from the occurrence of slipping, and changes the current command value to consume the excess power, at the step S70.

In the embodiments described above, the battery can be prevented from charging the instantly occurred electric energy caused by not only occurring an excess electric energy, but also an instantly occurred energy due to the unexpected disturbance, while the hybrid vehicle runs by a predetermined torque to be applied to the wheels. Further, the occurrence of the instant variation is judged by the motor controller, so that it is processed desirably, and the battery can be prevented from the deterioration.

The present invention is effective for the variations of the electric energy caused by varying the engine rotating speed and torque, in the cases of not only the variation of motor rotating speed, but also unexpected affection of the road, when the vehicle changes a lane and gets out of stuck in the mud on slipping, etc.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A control apparatus for controlling a rotational electric machine that rotates wheels of a vehicle and is driven by an electric power supplied from a battery via an inverter, said apparatus comprising:
    an instant variation detecting unit that detects an instantaneous variation of a current or voltage of the battery, judges whether the detected instantaneous variation of said current or voltage is greater than or equal to a predetermined value, and generates an output signal for increasing an internal loss of the rotational electric machine when the detected instantaneous variation of the current or voltage equals or exceeds the predetermined value; and
    a current command operating unit that, in response to said output signal from said instant variation detecting unit, outputs to said inverter a current command signal for increasing the internal loss of the rotational electric machine.

2. The control apparatus according to claim 1, wherein:
    after the voltage has risen the instant variation detecting unit determines a battery voltage, based on a charge power of the battery at a predetermined time from the present, which charge power is calculated based on a present charge power supplied to the battery and a rotating speed variation of the rotational electric machine, to detect the instantaneous variation from the battery voltage after the voltage has risen, when the rotational electric machine operates as a generator.

3. A control apparatus for controlling a rotational electric machine that rotates wheels of a vehicle and is driven by electric power supplied from a battery, said apparatus comprising:
    an instant variation detecting unit that detects an instantaneous variation of a current or voltage of the battery; and
    a current command operating unit that outputs a current command signal that changes a current that is to be sent to the rotational electric machine, such that an instantaneous variation detected by the instant variation detecting unit increases an internal loss of the rotational electric machine;
    wherein the instant variation detecting unit determines battery current based on a charge power of the battery, at a predetermined time from the present, which charge power is calculated based on a present charge power supplied to the battery and a rotating speed variation of the rotational electric machine, and detects the instantaneous variation based on the determined battery current, when the rotational electric machine operates as a generator.

4. The control apparatus according to claim 1, wherein:
    the instant variation detecting unit detects the instantaneous variation of the current or voltage of the battery from a rotating speed variation of the rotational electric machine, when the rotational electric machine operates as a generator.

5. The control apparatus according to claim 1, wherein:
    the instant variation detecting unit detects the instantaneous variation of the current or voltage of the battery from an accumulating capacity of the battery, a battery open-circuit voltage change rate, and a temperature of the battery, when the rotational electric machine operates as a generator.

6. The control apparatus according to claim 1, wherein:
    a generating power from a generator provided independently from the rotational electric machine and driven by an engine is charged into the battery; and
    the instant variation detecting unit detects that a gripping is recovered after wheels rotated by the rotational electric machine have slipped, and detects the instantaneous variation of the current or voltage of the battery, when the rotational electric machine operates as a generator.

7. The control apparatus according to claim 1, further comprising a slipping detection unit that detects slipping of the wheels driven by the rotational electric machine; wherein when slipping of the wheels is detected by the slipping detection unit, said current command operating unit changes the value of the current command signal for controlling current to be sent to the rotational electric machine so that an internal loss of the rotational electric machine is increased.

8. The control apparatus according to claim 1, wherein:
    the battery is charged with electric power generated from a generator that is independent from the rotational electric machine and driven by an engine of the vehicle;
    said control apparatus further comprises a slipping/gripping detection unit that detects a slipping of the wheels driven by the rotational electric machine and a recovery of a gripping from the slipping; and
    when recovery of gripping of the wheels is detected after slipping of the wheels has been detected by the slipping/gripping detection unit, said current command operating unit changes said current command signal such that the value of current to be sent to the rotational electric machine causes an internal loss of the rotational electric machine to increase.

9. A control apparatus for controlling a rotational electric machine that rotates wheels of a vehicle and is driven by an electric power supplied from a battery, said apparatus comprising:
    an instant variation detecting unit that detects an instantaneous variation of a current or voltage of the battery associated with an unexpected disturbance occurred at the vehicle, judges whether the detected instantaneous variation of said current or voltage is greater than or equal to a predetermined value, and generates an output signal for increasing an internal loss of the rotational electric machine when the detected instantaneous variation of the current or voltage equals or exceeds the predetermined value; and a current command operating unit that, in response to said output signal from said instant variation detecting unit, outputs to said inverter a current command signal for increasing the internal loss of the rotational electric machine.

10. A control apparatus for controlling a rotational electric machine that rotates wheels of a vehicle and is driven by an electric power supplied from a battery, said apparatus comprising:

an instant variation detecting unit that detects an instantaneous variation of a current or voltage of the battery, regardless of a driver's intention, judges whether the detected instantaneous variation of said current or voltage is greater than or equal to a predetermined value and generates an output signal for increasing an internal loss of the rotational electric machine when the detected instantaneous variation of the current or voltage equals or exceeds the predetermined value; and a current command operating unit that, in response to said output signal from said instant variation detecting unit outputs to said inverter a current command signal for increasing the internal loss of the rotational electric machine.

11. A driving apparatus for a vehicle including a rotational electric machine that rotates wheels of the vehicle and is driven by an electric power supplied from a battery, and a control unit that controls to drive the rotational electric machine, wherein the control unit comprises:

an instant variation detecting unit that detects an instantaneous variation of a current or voltage of the battery, judges whether the detected instantaneous variation of said current or voltage is greater than or equal to a predetermined value, and generates an output signal for increasing an internal loss of the rotational electric machine when the detected instantaneous variation of the current or voltage equals or exceeds the predetermined value; and a current command operating unit that, in response to said output signal from said instant variation detecting unit, outputs to said inverter a current command signal for increasing the internal loss of the rotational electric machine.

12. A control apparatus comprising:

an inverter for converting DC power supplied from a battery into AC power for driving a rotational electric machine that rotates wheels of a vehicle; and a motor controller for controlling said rotational electric machine;

wherein said motor controller comprises, an instant variation detecting unit that detects an instantaneous variation of a current or voltage of the battery, judges whether said instantaneous variation is greater than or equal to a predetermined value, and generates an output signal for increasing an internal loss of the rotational electric machine when the detected instantaneous variation of the current or voltage is greater than or equal to the predetermined value; and a current command operating unit that, in response to said output signal from said instant variation detecting unit, outputs a command signal for increasing the internal loss of the rotational electric machine to said inverter.

* * * * *